US012678712B2

(12) United States Patent
Williams et al.

(10) Patent No.: US 12,678,712 B2
(45) Date of Patent: Jul. 14, 2026

(54) METHODS TO DRAWDOWN PIPE SECTIONS WITH THE USE OR REGULATION CONTROL OF FLARING AND CROSS-COMPRESSION TECHNIQUE

(71) Applicant: ZENRG Services, LLC, Houston, TX (US)

(72) Inventors: Ronald Williams, Kingwood, TX (US); Sam Edwards, Houston, TX (US); Joe Chandler, Houston, TX (US); Cameron Brasier, Spring, TX (US)

(73) Assignee: Zenrg Services, LLC, Houston, TX (US)

( * ) Notice: Subject to any disclaimer, the term of this patent is extended or adjusted under 35 U.S.C. 154(b) by 416 days.

(21) Appl. No.: 18/519,029

(22) Filed: Nov. 26, 2023

(65) Prior Publication Data

US 2024/0173649 A1     May 30, 2024

Related U.S. Application Data

(60) Provisional application No. 63/428,135, filed on Nov. 28, 2022.

(51) Int. Cl.
*B01D 17/02* (2006.01)
*F23G 7/08* (2006.01)

(52) U.S. Cl.
CPC ........... *B01D 17/0214* (2013.01); *F23G 7/08* (2013.01)

(58) Field of Classification Search
None
See application file for complete search history.

(56) References Cited

U.S. PATENT DOCUMENTS

| | | | | |
|---|---|---|---|---|
| 2,179,131 A | * | 11/1939 | Millard ................... | C10G 33/06 |
| | | | | 96/159 |
| 2,610,697 A | * | 9/1952 | Lovelady ............... | B01D 45/02 |
| | | | | 210/801 |
| 2,638,223 A | * | 5/1953 | Parks ..................... | B01D 45/02 |
| | | | | 210/114 |
| 2,688,368 A | * | 9/1954 | Rodgers ................. | E21B 41/02 |
| | | | | 507/939 |
| 2,710,071 A | * | 6/1955 | Kinser .................... | E21B 43/36 |
| | | | | 137/122 |
| 2,751,998 A | * | 6/1956 | Glasgow ................ | C10G 33/06 |
| | | | | 210/708 |
| 2,783,854 A | * | 3/1957 | Lovelady ........... | B01D 19/0042 |
| | | | | 210/182 |

(Continued)

*Primary Examiner* — Robert J Popovics
(74) *Attorney, Agent, or Firm* — Mintz, Levin, Cohn, Ferris, Glovsky, Popeo, P.C.

(57) ABSTRACT

A method to drawdown pipe sections with the use or regulation control of flaring and cross-compression technique. The method allows to evacuate a fluid mixture from a drawdown section. The fluid mixture typically contains a liquid phase and a gas phase. The method includes flowing the fluid mixture from the drawdown section towards a separation vessel, and then out of the separation vessel to simultaneously flow the gas phase towards a flare for burning and flow the liquid phase towards one or more pumps towards an adjoining section. The proposed method allows recovering a higher proportion of the fluid mixture, as recycled product, and therefore limiting the combustion of the gas phase towards the atmosphere.

15 Claims, 3 Drawing Sheets

(56) References Cited

U.S. PATENT DOCUMENTS

| | | | | |
|---|---|---|---|---|
| 2,812,034 A | * | 11/1957 | Mckelvey, Jr. | B01D 45/02 |
| | | | | 55/DIG. 25 |
| 2,825,422 A | * | 3/1958 | Schoenfeld | C10G 33/06 |
| | | | | 96/159 |
| 2,829,774 A | * | 4/1958 | Jacques | B01D 17/045 |
| | | | | 210/114 |
| 2,870,860 A | * | 1/1959 | Ray | E21B 43/34 |
| | | | | 96/168 |
| 2,873,814 A | * | 2/1959 | Maher | E21B 43/34 |
| | | | | 585/950 |
| 2,998,096 A | * | 8/1961 | Snipes | F22B 37/265 |
| | | | | 96/183 |
| 3,025,928 A | * | 3/1962 | Heath | E21B 43/34 |
| | | | | 96/184 |
| 3,077,713 A | * | 2/1963 | Sinex | B01D 53/26 |
| | | | | 210/123 |
| 3,105,855 A | * | 10/1963 | Meyers | E21B 43/34 |
| | | | | 585/815 |
| 3,119,674 A | * | 1/1964 | Glasgow | B01D 1/00 |
| | | | | 96/184 |
| 3,159,473 A | * | 12/1964 | Meyers | E21B 43/34 |
| | | | | 585/812 |
| 3,212,232 A | * | 10/1965 | Mcminn | B01D 50/00 |
| | | | | 95/243 |
| 3,228,174 A | * | 1/1966 | Perry | B01D 19/0031 |
| | | | | 55/484 |
| 3,246,451 A | * | 4/1966 | Glasgow | G05D 9/00 |
| | | | | 137/262 |
| 3,255,574 A | * | 6/1966 | Glasgow | B01D 17/042 |
| | | | | 96/186 |
| 3,264,204 A | * | 8/1966 | Jarvis | C10G 33/02 |
| | | | | 95/79 |
| 3,312,044 A | * | 4/1967 | Mccarter | E21B 43/34 |
| | | | | 96/159 |
| 3,347,773 A | * | 10/1967 | Turner | B01D 17/06 |
| | | | | 204/662 |
| 3,360,903 A | * | 1/1968 | Meyer | B01D 17/042 |
| | | | | 96/417 |
| 3,394,530 A | * | 7/1968 | O'Neil | B01D 17/0208 |
| | | | | 96/159 |
| 3,413,778 A | * | 12/1968 | Lavery | B01D 19/0042 |
| | | | | 96/190 |
| 3,416,547 A | * | 12/1968 | Glenn, Jr. | F16L 55/00 |
| | | | | 137/391 |
| 3,568,771 A | * | 3/1971 | Vincent | F04D 13/10 |
| | | | | 166/66.4 |
| 3,578,077 A | * | 5/1971 | Glenn, Jr. | E21B 43/34 |
| | | | | 137/193 |
| 3,623,608 A | * | 11/1971 | Waterman | B01D 17/047 |
| | | | | 210/221.2 |
| 3,633,687 A | * | 1/1972 | West | E21B 21/067 |
| | | | | 175/48 |
| 3,646,730 A | * | 3/1972 | Reid | B01D 46/72 |
| | | | | 55/504 |
| 3,672,127 A | * | 6/1972 | Mayse | B01D 17/06 |
| | | | | 204/662 |
| 3,705,626 A | * | 12/1972 | Glenn, Jr. | E21B 43/34 |
| | | | | 166/250.15 |
| 3,709,292 A | * | 1/1973 | Palmour | E21B 43/00 |
| | | | | 166/105.5 |
| 3,722,184 A | * | 3/1973 | McMinn | B01D 19/02 |
| | | | | 196/155 |
| 3,759,324 A | * | 9/1973 | Mecusker | B04C 9/00 |
| | | | | 166/267 |
| 3,782,463 A | * | 1/1974 | Palmour | E21B 43/34 |
| | | | | 166/105.5 |
| 3,784,010 A | * | 1/1974 | Barra | B01D 36/003 |
| | | | | 210/114 |
| 3,802,501 A | * | 4/1974 | Mecusker | E21B 43/34 |
| | | | | 166/75.12 |
| 3,804,252 A | * | 4/1974 | Rishel | B01D 17/0214 |
| | | | | 210/800 |
| 3,971,719 A | * | 7/1976 | Peters | E21B 43/34 |
| | | | | 210/114 |
| 4,010,012 A | * | 3/1977 | Griffin, III | E21B 21/067 |
| | | | | 96/159 |
| 4,059,517 A | * | 11/1977 | Strahorn | B01D 17/0208 |
| | | | | 96/184 |
| 4,073,734 A | * | 2/1978 | Lowrie | E21B 43/36 |
| | | | | 96/184 |
| 4,160,652 A | * | 7/1979 | Martin | F17D 3/03 |
| | | | | 95/254 |
| 4,184,359 A | * | 1/1980 | Gracey | G01N 7/14 |
| | | | | 73/19.01 |
| 4,187,089 A | * | 2/1980 | Hodgson | B01D 45/18 |
| | | | | 55/463 |
| 4,233,154 A | * | 11/1980 | Presley | E21B 43/34 |
| | | | | 166/267 |
| 4,243,528 A | * | 1/1981 | Hubbard et al. | B01D 17/0208 |
| | | | | 210/DIG. 5 |
| 4,346,726 A | * | 8/1982 | Bayen | F17D 1/04 |
| | | | | 137/15.04 |
| 4,396,404 A | * | 8/1983 | Engelman | C10G 33/02 |
| | | | | 95/252 |
| 4,435,196 A | * | 3/1984 | Pielkenrood | B01D 17/0211 |
| | | | | 96/184 |
| 4,539,023 A | * | 9/1985 | Boley | E21B 43/36 |
| | | | | 96/184 |
| 4,547,149 A | * | 10/1985 | Chaudot | F23G 7/085 |
| | | | | 431/117 |
| 4,583,998 A | * | 4/1986 | Reid | B01D 19/0042 |
| | | | | 210/801 |
| 4,596,136 A | * | 6/1986 | Zacharias | G01N 33/2823 |
| | | | | 73/61.45 |
| 4,604,196 A | * | 8/1986 | Lowrie | E21B 43/34 |
| | | | | 210/522 |
| 4,673,500 A | * | 6/1987 | Hoofnagle | E21B 43/34 |
| | | | | 210/DIG. 5 |
| 4,778,443 A | * | 10/1988 | Sands | C10G 33/06 |
| | | | | 494/36 |
| 4,824,447 A | * | 4/1989 | Goldsberry | B01D 53/22 |
| | | | | 96/9 |
| 4,824,579 A | * | 4/1989 | George | B01D 17/0214 |
| | | | | 210/776 |
| 4,836,017 A | * | 6/1989 | Bozek | G01N 11/02 |
| | | | | 210/138 |
| 4,852,395 A | * | 8/1989 | Kolpak | G01N 33/2823 |
| | | | | 73/861.04 |
| 4,948,393 A | * | 8/1990 | Hodson | B01D 17/0208 |
| | | | | 95/254 |
| 4,978,373 A | * | 12/1990 | Endacott | B01D 19/00 |
| | | | | 96/187 |
| 5,064,448 A | * | 11/1991 | Choi | B01D 19/0057 |
| | | | | 96/209 |
| 5,082,556 A | * | 1/1992 | Reese | E21B 43/35 |
| | | | | 210/123 |
| 5,090,238 A | * | 2/1992 | Jones | E21B 43/34 |
| | | | | 73/61.44 |
| 5,132,011 A | * | 7/1992 | Ferris | B01D 17/042 |
| | | | | 210/519 |
| 5,147,534 A | * | 9/1992 | Rymal, Jr. | B01D 17/0214 |
| | | | | 210/197 |
| 5,149,344 A | * | 9/1992 | Macy | B01D 17/0208 |
| | | | | 96/182 |
| 5,154,735 A | * | 10/1992 | Dinsmore | B01D 53/04 |
| | | | | 95/146 |
| 5,204,000 A | * | 4/1993 | Steadman | B01D 17/0208 |
| | | | | 210/519 |
| 5,211,842 A | * | 5/1993 | Tuss | E21B 43/34 |
| | | | | 210/194 |
| 5,218,985 A | * | 6/1993 | Berger | F22B 37/125 |
| | | | | 137/8 |
| 5,232,475 A | * | 8/1993 | Jepson | E21B 43/36 |
| | | | | 96/204 |
| 5,254,292 A | * | 10/1993 | Gabryelczyk | F17D 1/005 |
| | | | | 166/267 |
| 5,256,171 A | * | 10/1993 | Payne | E21B 43/34 |
| | | | | 95/212 |

(56)            References Cited

U.S. PATENT DOCUMENTS

| | | | | |
|---|---|---|---|---|
| 5,288,312 A * | 2/1994 | Payne | B01D 45/02 | 95/254 |
| 5,302,294 A * | 4/1994 | Schubert | E21B 43/34 | 96/183 |
| 5,375,618 A * | 12/1994 | Giannesini | E21B 43/00 | 137/565.33 |
| 5,377,714 A * | 1/1995 | Giannesini | E21B 43/34 | 137/110 |
| 5,393,202 A * | 2/1995 | Levallois | F04B 49/20 | 417/19 |
| 5,415,776 A * | 5/1995 | Homan | E21B 21/063 | 210/519 |
| 5,421,357 A * | 6/1995 | Levallois | F04D 31/00 | 137/8 |
| 5,464,522 A * | 11/1995 | MacEdmondson | B03C 11/00 | 204/666 |
| 5,480,063 A * | 1/1996 | Keyes | G01F 11/284 | 222/64 |
| 5,494,067 A * | 2/1996 | Levallois | F04D 31/00 | 137/154 |
| 5,524,665 A * | 6/1996 | Kolpak | B01D 19/0063 | 137/188 |
| 5,535,632 A * | 7/1996 | Kolpak | G01F 1/74 | 73/861.04 |
| 5,544,672 A * | 8/1996 | Payne | E21B 43/34 | 137/171 |
| 5,654,502 A * | 8/1997 | Dutton | G01N 33/2823 | 73/19.1 |
| 5,661,248 A * | 8/1997 | Bernicot | G01F 1/74 | 73/861.04 |
| 5,708,211 A * | 1/1998 | Jepson | G01F 1/708 | 73/861.04 |
| 5,711,338 A * | 1/1998 | Talon | F16K 5/0421 | 210/97 |
| 5,857,522 A * | 1/1999 | Bradfield | E21B 44/00 | 166/267 |
| 5,865,992 A * | 2/1999 | Edmondson | B01D 17/0211 | 210/DIG. 5 |
| 5,900,137 A * | 5/1999 | Homan | E21B 21/06 | 175/48 |
| 5,928,519 A * | 7/1999 | Homan | B01D 17/005 | 175/48 |
| 5,965,029 A * | 10/1999 | Simon | B01D 17/12 | 210/663 |
| 5,980,737 A * | 11/1999 | Rajewski | B01D 17/0214 | 166/267 |
| 6,041,668 A * | 3/2000 | Guieze | G01N 1/2247 | 73/863.03 |
| 6,056,004 A * | 5/2000 | Agnew | F16L 55/00 | 60/785 |
| 6,110,383 A * | 8/2000 | Coombs | B01D 17/00 | 210/123 |
| 6,134,951 A * | 10/2000 | Scott | G01F 1/74 | 73/861.04 |
| 6,164,308 A * | 12/2000 | Butler | F04D 31/00 | 137/561 A |
| 6,187,079 B1 * | 2/2001 | Bridger | E21B 43/34 | 96/182 |
| 6,196,310 B1 * | 3/2001 | Knight | E21B 43/34 | 166/66 |
| 6,199,631 B1 * | 3/2001 | Knight | E21B 43/34 | 166/105.5 |
| 6,209,651 B1 * | 4/2001 | Knight | E21B 43/00 | 166/250.01 |
| 6,214,092 B1 * | 4/2001 | Odom | E21B 43/35 | 96/170 |
| 6,214,220 B1 * | 4/2001 | Favret, Jr. | B01D 17/0208 | 210/260 |
| 6,216,781 B1 * | 4/2001 | Knight | E21B 43/38 | 166/267 |
| 6,234,030 B1 * | 5/2001 | Butler | G01N 33/2823 | 73/195 |
| 6,257,070 B1 * | 7/2001 | Giallorenzo | G01F 15/08 | 73/861.04 |
| 6,354,318 B2 * | 3/2002 | Butler | F04D 31/00 | 137/561 A |
| 6,375,718 B1 * | 4/2002 | Blangetti | F02C 6/18 | 96/197 |
| 6,390,114 B1 * | 5/2002 | Haandrikman | F17D 1/005 | 137/187 |
| 6,402,820 B1 * | 6/2002 | Tippetts | G05D 9/04 | 96/183 |
| 6,419,730 B1 * | 7/2002 | Chavez | B01D 45/08 | 55/433 |
| 6,453,584 B1 * | 9/2002 | Buckner | E21B 21/066 | 175/66 |
| 6,468,335 B1 * | 10/2002 | Polderman | B01D 17/00 | 96/182 |
| 6,537,458 B1 * | 3/2003 | Polderman | B01D 17/00 | 210/801 |
| 6,672,392 B2 * | 1/2004 | Reitz | E21B 43/122 | 166/372 |
| 6,673,135 B2 * | 1/2004 | West | B01D 45/16 | 95/271 |
| 6,709,500 B1 * | 3/2004 | West | B01D 17/06 | 96/216 |
| 6,716,268 B2 * | 4/2004 | Molyneux | F17D 1/005 | 96/174 |
| 6,773,605 B2 * | 8/2004 | Nyborg | B01D 17/00 | 210/744 |
| 6,790,367 B2 * | 9/2004 | Schmigel | B01D 21/32 | 210/103 |
| 6,881,329 B2 * | 4/2005 | Amado | B01D 17/0211 | 210/96.1 |
| 6,989,103 B2 * | 1/2006 | Mohsen | B01D 17/0208 | 210/708 |
| 7,024,951 B2 * | 4/2006 | Germond | G01N 1/2035 | 73/863.21 |
| 7,080,690 B2 * | 7/2006 | Reitz | E21B 43/121 | 166/372 |
| 7,103,521 B2 * | 9/2006 | Duret | E21B 43/122 | 175/25 |
| 7,239,967 B2 * | 7/2007 | Havre | F04D 31/00 | 702/50 |
| 7,278,543 B2 * | 10/2007 | Sagatun | B01D 17/0211 | 210/519 |
| 7,347,945 B2 * | 3/2008 | Amado | B01D 17/0208 | 166/267 |
| 7,364,661 B2 * | 4/2008 | Puik | B01D 17/12 | 210/744 |
| 7,383,102 B2 * | 6/2008 | Coward | G05D 7/0635 | 175/48 |
| 7,434,621 B2 * | 10/2008 | Aarvik | E21B 43/34 | 166/267 |
| 7,464,762 B2 * | 12/2008 | Duret | E21B 43/122 | 166/368 |
| 7,490,671 B2 * | 2/2009 | Gramme | B01D 17/00 | 166/267 |
| 7,531,030 B2 * | 5/2009 | Heath | C10L 3/10 | 96/183 |
| 7,531,099 B1 * | 5/2009 | Rhodes | B01D 17/0211 | 210/522 |
| 7,575,672 B1 * | 8/2009 | Gilmore | B01D 17/0211 | 96/186 |
| 7,617,940 B2 * | 11/2009 | Gramme | B08B 9/0551 | 210/519 |
| 7,654,397 B2 * | 2/2010 | Allouche | B01D 21/2444 | 210/104 |
| 7,749,308 B2 * | 7/2010 | McCully | B08B 15/00 | 95/291 |
| 7,871,526 B2 * | 1/2011 | Allouche | B01D 17/0211 | 210/744 |
| 7,947,121 B2 * | 5/2011 | Bras | B01D 17/0214 | 96/182 |
| 8,057,580 B2 * | 11/2011 | Poorte | E21B 43/36 | 96/155 |
| 8,061,186 B2 * | 11/2011 | Gysling | G01N 29/024 | 73/61.54 |

(56) References Cited

U.S. PATENT DOCUMENTS

| | | | | |
|---|---|---|---|---|
| 8,075,785 B2* | 12/2011 | Dufrene | B01D 21/10 | |
| | | | 210/744 | |
| 8,133,300 B1* | 3/2012 | Gonsalves, III | B01D 19/0042 | |
| | | | 95/254 | |
| 8,192,632 B2* | 6/2012 | Michael | C10G 33/06 | |
| | | | 210/DIG. 5 | |
| 8,277,641 B2* | 10/2012 | Tertel | C10G 19/08 | |
| | | | 208/228 | |
| 8,323,489 B2* | 12/2012 | Lee | C02F 1/24 | |
| | | | 210/205 | |
| 8,367,009 B2* | 2/2013 | Nagl | C01B 17/0205 | |
| | | | 422/250.1 | |
| 8,372,294 B2* | 2/2013 | Grotheim | B01D 19/0036 | |
| | | | 95/266 | |
| 8,414,781 B2* | 4/2013 | Berard | B01D 19/0042 | |
| | | | 210/744 | |
| 8,449,821 B2* | 5/2013 | Sharma | B01D 19/0042 | |
| | | | 96/182 | |
| 8,453,747 B2* | 6/2013 | Holm | F17D 1/005 | |
| | | | 166/344 | |
| 8,459,285 B2* | 6/2013 | Calvert | E21B 43/12 | |
| | | | 702/50 | |
| 8,470,080 B1* | 6/2013 | Ball, IV | B01D 21/2405 | |
| | | | 95/24 | |
| 8,489,244 B2* | 7/2013 | Cao | B01D 19/0063 | |
| | | | 700/282 | |
| 8,529,215 B2* | 9/2013 | Heath | F04B 25/00 | |
| | | | 62/510 | |
| 8,657,896 B2* | 2/2014 | Gouy | B01D 19/0042 | |
| | | | 210/512.1 | |
| 8,657,940 B2* | 2/2014 | Aarebrot | E21B 43/35 | |
| | | | 96/182 | |
| 8,771,394 B2* | 7/2014 | Skofteland | F04D 31/00 | |
| | | | 55/447 | |
| 8,814,990 B2* | 8/2014 | Stinessen | F04D 29/705 | |
| | | | 55/467 | |
| 8,840,703 B1* | 9/2014 | Heath | C10L 3/10 | |
| | | | 96/201 | |
| 8,864,881 B2* | 10/2014 | Suppiah | B01D 19/0063 | |
| | | | 96/194 | |
| 8,864,887 B2* | 10/2014 | Heath | B01D 3/322 | |
| | | | 95/193 | |
| 8,900,460 B2* | 12/2014 | Sams | B01D 21/0024 | |
| | | | 210/708 | |
| 9,034,086 B2* | 5/2015 | Daniels | B01D 17/0217 | |
| | | | 96/188 | |
| 9,095,799 B1* | 8/2015 | Packard | B01D 21/003 | |
| 9,114,332 B1* | 8/2015 | Liu | B01D 19/0063 | |
| 9,141,114 B2* | 9/2015 | Slupphaug | G05D 7/0635 | |
| 9,151,137 B2* | 10/2015 | Daigle | E21B 34/025 | |
| 9,238,183 B2* | 1/2016 | Sams | C02F 1/24 | |
| 9,248,401 B2* | 2/2016 | Wiggins | B01D 53/263 | |
| 9,323,252 B2* | 4/2016 | Slupphaug | E21B 43/12 | |
| 9,371,724 B2* | 6/2016 | Grave | E21B 43/36 | |
| 9,387,432 B2* | 7/2016 | Zainal Abidin | B01D 45/02 | |
| 9,512,700 B2* | 12/2016 | Becquin | E21B 43/017 | |
| 9,566,542 B2* | 2/2017 | Stinessen | F17D 1/005 | |
| 9,649,584 B2* | 5/2017 | Burns | B01D 46/2414 | |
| 9,744,489 B2* | 8/2017 | McKenzie | B01D 21/0012 | |
| 9,815,012 B2* | 11/2017 | Cloud | B01D 46/0031 | |
| 9,828,556 B1* | 11/2017 | Rehm | C10G 7/00 | |
| 9,833,727 B1* | 12/2017 | Ball, IV | B01D 17/0217 | |
| 9,840,895 B1* | 12/2017 | Kuhn | E21B 43/12 | |
| 9,968,867 B2* | 5/2018 | Warintarawat | B01D 21/245 | |
| 9,982,516 B2* | 5/2018 | Ricotta | C10G 33/06 | |
| 9,982,846 B2* | 5/2018 | Brenskelle | E21B 43/34 | |
| 10,036,217 B2* | 7/2018 | Munisteri | E21B 43/40 | |
| 10,052,565 B2* | 8/2018 | Heath | C10G 31/06 | |
| 10,053,636 B2* | 8/2018 | Rehm | C10G 33/00 | |
| 10,137,387 B2* | 11/2018 | Skoglund | B01D 19/0042 | |
| 10,150,923 B2* | 12/2018 | Rehm | C10G 33/00 | |
| 10,197,425 B2* | 2/2019 | Pathier | G01F 15/005 | |
| 10,208,745 B2* | 2/2019 | Abrol | F04C 14/24 | |

| | | | | |
|---|---|---|---|---|
| 10,238,992 B2* | 3/2019 | Oshinowo | B01D 17/12 | |
| 10,272,365 B2* | 4/2019 | Cumbee | B01D 19/00 | |
| 10,301,554 B2* | 5/2019 | Rehm | C10G 7/00 | |
| 10,343,096 B2* | 7/2019 | Cloud | B01D 46/0031 | |
| 10,456,714 B2* | 10/2019 | Weaver | B01D 19/0073 | |
| 10,463,990 B2* | 11/2019 | Becquin | B01D 19/0063 | |
| 10,465,492 B2* | 11/2019 | Ricotta | C10L 3/101 | |
| 10,561,974 B2* | 2/2020 | Steiner | B01D 50/20 | |
| 10,596,490 B2* | 3/2020 | Weaver | B01D 17/0208 | |
| 10,626,860 B2* | 4/2020 | Tomari | F25B 43/02 | |
| 10,655,997 B2* | 5/2020 | Pathier | G01F 1/74 | |
| 10,792,604 B2* | 10/2020 | Steiner | B01D 45/16 | |
| 10,888,803 B2* | 1/2021 | Akdim | C10G 33/02 | |
| 10,895,141 B2* | 1/2021 | Elmer | E21B 43/34 | |
| 10,913,013 B2* | 2/2021 | Sams | B01D 21/009 | |
| 10,967,297 B2* | 4/2021 | Larnholm | B01D 17/0214 | |
| 10,987,611 B2* | 4/2021 | Weaver | B01D 19/0073 | |
| 10,994,225 B2* | 5/2021 | Sundström | B01D 17/0208 | |
| 11,035,215 B2* | 6/2021 | Kunkel | B01D 19/0063 | |
| 11,065,559 B2* | 7/2021 | Johnson | B01D 21/0003 | |
| 11,071,934 B2* | 7/2021 | Cloud | B01D 46/64 | |
| 11,090,581 B1* | 8/2021 | Oshinowo | B01D 17/045 | |
| 11,148,071 B2* | 10/2021 | Kelsey | B01D 17/045 | |
| 11,268,361 B2* | 3/2022 | Jensen | B01D 19/0042 | |
| 11,274,539 B2* | 3/2022 | Jensen | B01D 19/0042 | |
| 11,274,540 B2* | 3/2022 | Jensen | B01D 17/0211 | |
| 11,285,405 B2* | 3/2022 | Johnson | B01D 17/0211 | |
| 11,454,351 B2* | 9/2022 | Guan | F17D 1/005 | |
| 11,458,422 B2* | 10/2022 | Soares Da Silva | | |
| | | | B01D 17/0214 | |
| 11,603,747 B2* | 3/2023 | Liu | B01D 17/0217 | |
| 11,639,656 B1* | 5/2023 | Welch | B01D 19/0042 | |
| | | | 204/661 | |
| 11,821,564 B2* | 11/2023 | Benincosa | F17D 1/04 | |
| 11,976,770 B2* | 5/2024 | Alghufaili | B01D 21/0012 | |
| 12,090,421 B2* | 9/2024 | Li | B01D 17/0208 | |
| 12,427,442 B2* | 9/2025 | Webster | E21F 7/00 | |
| 12,473,501 B2* | 11/2025 | Soliman | B01D 3/346 | |
| 2001/0011556 A1* | 8/2001 | Butler | F17D 1/005 | |
| | | | 137/565.29 | |
| 2002/0193976 A1* | 12/2002 | Duret | F17D 1/17 | |
| | | | 703/10 | |
| 2003/0070813 A1* | 4/2003 | Irwin, Jr. | E21B 43/122 | |
| | | | 166/372 | |
| 2003/0075511 A1* | 4/2003 | Nyborg | B01D 17/0211 | |
| | | | 210/741 | |
| 2003/0150324 A1* | 8/2003 | West | B01D 17/0211 | |
| | | | 95/268 | |
| 2003/0159986 A1* | 8/2003 | Amado | B01D 17/0211 | |
| | | | 210/521 | |
| 2003/0217956 A1* | 11/2003 | Mohsen | B01D 17/047 | |
| | | | 96/182 | |
| 2003/0225533 A1* | 12/2003 | King | G01N 9/24 | |
| | | | 702/50 | |
| 2004/0007131 A1* | 1/2004 | Chitty | E21B 21/063 | |
| | | | 96/183 | |
| 2004/0011748 A1* | 1/2004 | Amado | B01D 17/0208 | |
| | | | 210/800 | |
| 2004/0020860 A1* | 2/2004 | Schmigel | B01D 21/32 | |
| | | | 210/744 | |
| 2004/0112150 A1* | 6/2004 | Germond | G01N 1/2035 | |
| | | | 73/863.86 | |
| 2004/0245182 A1* | 12/2004 | Appleford | E21B 43/34 | |
| | | | 210/170.11 | |
| 2005/0150842 A1* | 7/2005 | Puik | B01D 17/0214 | |
| | | | 210/744 | |
| 2005/0250860 A1* | 11/2005 | Appleford | E21B 43/36 | |
| | | | 516/135 | |
| 2006/0041392 A1* | 2/2006 | Korske | F04D 31/00 | |
| | | | 702/50 | |
| 2006/0070735 A1* | 4/2006 | Guerra | E21B 43/35 | |
| | | | 175/207 | |
| 2006/0151167 A1* | 7/2006 | Aarvik | E21B 43/00 | |
| | | | 166/267 | |
| 2008/0221798 A1* | 9/2008 | Pariag | G01V 9/00 | |
| | | | 702/9 | |

(56)                References Cited

U.S. PATENT DOCUMENTS

| | | | |
|---|---|---|---|
| 2009/0133578 A1* | 5/2009 | Bras | B01D 19/0063 95/259 |
| 2009/0149969 A1* | 6/2009 | Slupphaug | G05D 7/0635 700/282 |
| 2009/0159426 A1* | 6/2009 | Chen | C10G 33/02 422/186.04 |
| 2009/0282985 A1* | 11/2009 | Whiteley | B01D 17/0211 96/204 |
| 2010/0051267 A1* | 3/2010 | Lowe | E21B 43/13 166/250.15 |
| 2010/0180769 A1* | 7/2010 | Grenstad | E21B 43/36 95/260 |
| 2010/0282694 A1* | 11/2010 | Menchaca Lobato | B01D 45/08 210/802 |
| 2010/0294317 A1* | 11/2010 | Dufrene | B01D 21/2494 134/22.18 |
| 2011/0089013 A1* | 4/2011 | Sakurai | C02F 1/24 210/194 |
| 2011/0142747 A1* | 6/2011 | Nagl | B01D 19/0063 422/106 |
| 2012/0000643 A1* | 1/2012 | Bruun | B01D 19/0063 55/421 |
| 2012/0160103 A1* | 6/2012 | Suppiah | B01D 19/0063 96/155 |
| 2012/0165995 A1* | 6/2012 | Crawley | F17D 3/01 700/282 |
| 2012/0211445 A1* | 8/2012 | Grotheim | B01D 19/0036 210/808 |
| 2012/0285896 A1* | 11/2012 | Black | B01D 17/047 210/741 |
| 2013/0075338 A1* | 3/2013 | Murtagh | B03D 1/1412 210/151 |
| 2013/0186839 A1* | 7/2013 | Nagl | B01D 17/0214 210/741 |
| 2013/0312614 A1* | 11/2013 | Zainal Abidin | B01D 45/08 96/242 |
| 2014/0130676 A1* | 5/2014 | Daniels | B01D 19/0042 96/194 |
| 2014/0209465 A1* | 7/2014 | Whitney | C10G 33/06 204/554 |
| 2015/0093259 A1* | 4/2015 | Pepper | F04B 23/10 417/54 |
| 2015/0135797 A1* | 5/2015 | Romero | G01F 1/74 73/1.16 |
| 2015/0260026 A1* | 9/2015 | Whitney | B01D 17/0217 166/357 |
| 2015/0275601 A1* | 10/2015 | Munisteri | C02F 1/487 210/252 |
| 2015/0299583 A1* | 10/2015 | Kelsey | C10G 33/06 210/799 |
| 2015/0306520 A1* | 10/2015 | Grave | E21B 43/40 96/155 |
| 2016/0129371 A1* | 5/2016 | Black | E21B 43/34 210/137 |
| 2016/0243466 A1* | 8/2016 | Skoglund | B01D 19/0036 |
| 2016/0273950 A1* | 9/2016 | Henry | G01F 1/74 |
| 2016/0298992 A1* | 10/2016 | Pathier | G01F 15/08 |
| 2017/0043278 A1* | 2/2017 | Kelsey | C10G 33/06 |
| 2017/0120165 A1* | 5/2017 | Munisteri | B01D 21/302 |
| 2017/0246559 A1* | 8/2017 | Li | B01D 17/12 |
| 2017/0312654 A1* | 11/2017 | Larnholm | B01D 17/12 |
| 2017/0361258 A1* | 12/2017 | Cloud | B01D 46/0031 |
| 2018/0119031 A1* | 5/2018 | Haworth | B01D 11/0484 |
| 2019/0063203 A1* | 2/2019 | Arefjord | E21B 43/34 |
| 2019/0211662 A1* | 7/2019 | Elmer | B01D 21/34 |
| 2020/0324224 A1* | 10/2020 | Allouche | E21B 49/0875 |
| 2020/0340338 A1* | 10/2020 | Jensen | B01D 19/0057 |
| 2020/0346140 A1* | 11/2020 | Soares Da Silva | B01D 21/0006 |
| 2020/0370407 A1* | 11/2020 | Bittel | C10G 33/08 |
| 2021/0394084 A1* | 12/2021 | Li | C02F 1/40 |
| 2022/0032212 A1* | 2/2022 | Kelsey | C10G 31/09 |
| 2022/0090722 A1* | 3/2022 | Benincosa | F17D 1/04 |
| 2022/0099233 A1* | 3/2022 | Alghufaili | B01D 21/0012 |
| 2023/0013295 A1* | 1/2023 | Malone | B01D 17/12 |
| 2023/0068476 A1* | 3/2023 | Bissell | B01D 19/0063 |
| 2023/0114563 A1* | 4/2023 | Baaren | B01D 17/06 210/803 |
| 2024/0173649 A1* | 5/2024 | Williams | F23G 7/08 |
| 2024/0301783 A1* | 9/2024 | Williams | E21B 43/121 |
| 2024/0328267 A1* | 10/2024 | Williams | E21B 21/065 |
| 2024/0382879 A1* | 11/2024 | Hajri | B01D 29/68 |
| 2025/0314166 A1* | 10/2025 | Williams | E21B 43/122 |

* cited by examiner

METHODS TO DRAWDOWN PIPE SECTIONS WITH THE USE OR REGULATION CONTROL OF FLARING AND CROSS-COMPRESSION TECHNIQUE

BACKGROUND

The field of use includes the draw-down or de-inventory of pipeline sections, such as transmission and gathering lines in the midstream sector. Typical pipeline sections may contain Liquefied Petroleum Gas, abbreviated as LPG, or Highly Volatile Liquid, abbreviated as HVL. The pipelines may therefore contain a mixture of liquid and gas, as well as any intermediate phases between liquid and gas.

Pipelines may need a draw-down operation for various reasons, including the routine maintenance for issues like valve replacement, corrosion or damage repair to the pipe. Other needs may include operational requirements like to tie-in connections for an addition of lateral pipelines, relocations of existing pipelines to facilitate other utilities or infrastructure. Other needs may also include inspections such as pressure testing or cutting out stuck inline inspection tools, idling pipelines when not in use for long periods or abandonment at the end of its service life.

A typical existing method used to perform a LPG or HVL pipeline draw-down or de-inventory operation is to use a dual phase flare stack designed to burn the evacuated fluids. During this process, the flare typically initially receives 100% liquid phase until the product pressure in the pipeline section reaches its vapor pressure. At this point, the flare receives a multi-phase fluid defined as a mix of liquid and vapor phase, because the product may cold-boil in the pipeline. At some point during this process, the percentage of vapor will far exceed the liquid in the line. At this stage, the flare will receive significantly more vapor along with low volume slugs of liquid. Slug flow is caused by the vapor flowing faster thru the flare than the liquid thereby causing wave action of the liquid left in the pipe. This fast-flowing vapor pushes the liquid wave up from the below the grade or ground level of the pipeline, up to the flare connection above grade. Since the liquid then slows the flow to the flare, the vapor velocity in the pipe slows causing the wave to fall back down to the lower portions of the pipeline causing the process to repeat until no liquid is left or until there is so little liquid; the vapor velocity is not high enough to bring the liquid up to the connection point. Many variables may control this slugging action including diameter of the pipe, vapor pressure of the product, elevation changes of the pipe and capacity of the flare system to flow these fluids and vapors.

When using this existing method, most of the product in the pipeline may be treated as waste and consumed by the flare. Therefore, most value of the product inside the pipeline may be lost and the combustion of the entire volume of product within the pipeline may increase the amount of released emission in the atmosphere.

Another existing prior art may include using a multi-phase cross-compression unit to pump product from one pipeline section being de-inventoried into an adjacent section of pipeline or vessel. These units are most effective during the stage when they are receiving liquids as the density is higher than the gas or vapor phase, thereby moving more product with each stroke of the compressor. Though, once the cross-compression unit no longer receives liquids, the effectiveness drops off significantly and the process becomes dependent on the expansion ratio of the product and its vapor pressure. For example, the expansion ratio of propane is 270:1, therefore the compressor would need to pump 270 cubic feet of vapor to equal 1 cubic foot of liquid de-inventoried product. Conversion effects may also be part of the process as with varying pressures, liquid volume may become gas volume as the pressure inside some pipe section is decreasing, for example due to the movement of fluids caused by the cross-compression unit.

When using this method, most of the product in the pipeline may be recovered, though this method may have a limitation on longer sections of pipeline, typically above 5000 ft [1500 m]. Using this method on longer section of pipeline, the time required for draw-down may typically be above 36 hours per 1000 ft [300 m] of pipeline. This time required may be cost prohibitive for some operations as it would keep the pipeline out of service during the drawdown operation, resulting in a low efficiency method.

BRIEF DESCRIPTION OF THE DRAWINGS

For a more detailed description of the embodiments of the disclosure, reference will now be made to the accompanying drawings.

DETAILED DESCRIPTION

It is to be understood that the following disclosure describes several exemplary embodiments for implementing different features, structures, or functions of the invention. Exemplary embodiments of components, arrangements, and configurations are described below to simplify the disclosure; however, these exemplary embodiments are provided merely as examples and are not intended to limit the scope of the invention.

Even if advantages and other features will become apparent from the following schematics, description and proposed claims, the proposed list of advantages may be limiting.

The proposed invention process may use a combination of some elements of the two methods described in the existing art section, while adding specific usage, features and control method.

One advantage of the proposed invention would be to capture as much product as practical from the drawdown pipeline, while completing the draw-down in the same time frame as a typical flaring operation would take. The proposed invention may therefore result in a higher proportion of product recovery from the drawdown pipeline, typically between 40% and 80%, while limiting the combustion of hydrocarbon product in the atmosphere, and while keeping the reduced time of straight flaring operation. Overall, the proposed invention may improve both the financial and environmental aspects of the drawdown operation.

Following item numbers refer to the FIGS. 1 to 5, which are depicting the proposed invention.

Figure 1:
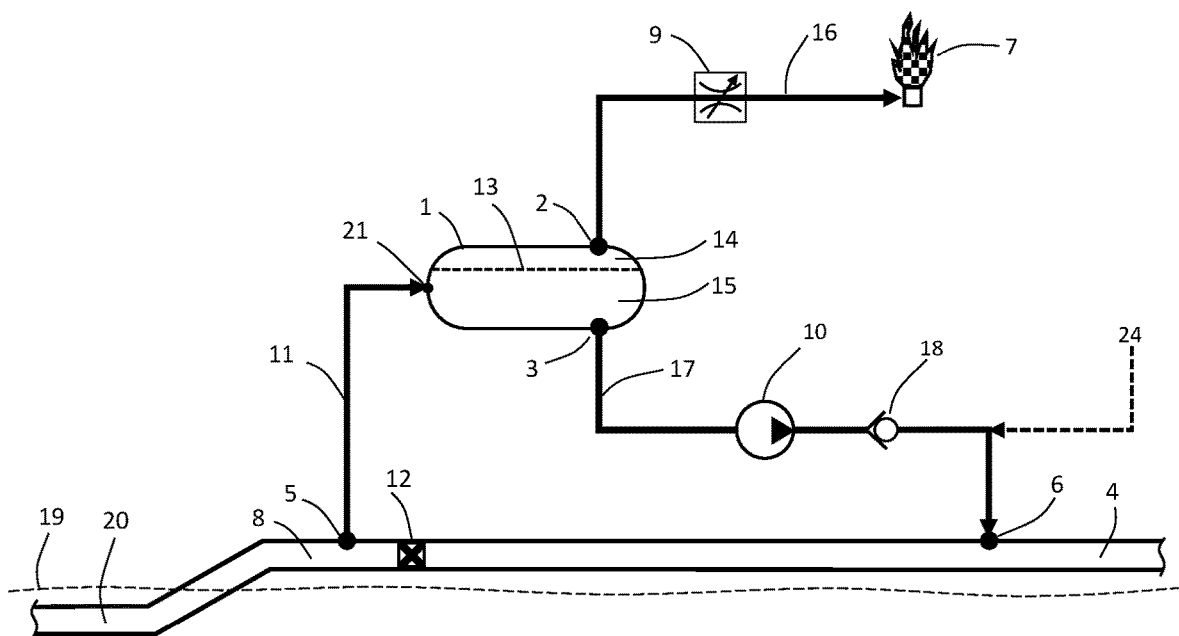
FIG. 1 represents a schematic of the components and connections related to the proposed invention.

As depicted in FIG. 1, the proposed application process may include a separation vessel 1, inline between a drawdown section 8 and a flare 7.

The separation vessel 1 may allow the flare 7 to operate at constant high velocity rates only receiving gas or vapor from a vessel top connection 2, typically located at the top of the separation vessel 1.

Typically, the drawdown section 8 would be considered as the section intended to be de-inventoried or drawn down. The drawdown section 8 may have the shape of a pipeline or a hose, as depicted in FIG. 1, or may have the shape of a tank or a vessel. The drawdown section 8 may be filled with a fluid mixture of liquid and gas. The composition of the fluid mixture may depend on the fluid composition, such as its chemistry, the pressure and the temperature present inside the drawdown section 8. The gas may also be designated as vapor. Typically, the transition from liquid to gas will occur at different pressure and temperature for the different components of the fluid mixture. For example, at room temperature, typical liquid to gas transition may occur around 450 psi [3.1 MPa] for double Carbon components, or C2s, such as methane, at around 120 psi [0.8 MPa] for triple Carbon components, or C3s, such as propane, and at around 40 psi [0.28 MPa] for quadruple Carbon components, or C4s, such as butane.

The flare 7 would be a device to combust, oxidize or vent a waste product, such as vapors or gas. A gas phase 14 would be typically present on the upper section within the separation vessel 1. The gas phase 14 may flow through a vessel top connection 2 and through a flare section 16. The flare 7 may also be designated as flare stack, combustor, incinerator, thermal oxidizer, burner, vent stack, stack pipe or riser.

A flow line 11 may connect the drawdown section 8 to the separation vessel 1 at a flow connection feed-in 21. The flow line 11 may be typically linked to the drawdown section 8 through a drawdown section connection 5. The drawdown section connection 5 may be a tie-in point on the pipeline of the drawdown section 8 allowing flowing the mixture of liquid and gas inside the flow line 11.

The separation vessel 1, also designated as knock-out tank, or gas buster, or slug catcher, or trap tank, may have the shape of a barrel or tank. The longest vessel dimension may be oriented either towards a vertical axis or towards a horizontal axis. In FIG. 1, the separation vessel 1 is represented with the longest dimension towards a horizontal axis. The typical function of the separation vessel 1 would be to separate a liquid phase 15 from the gas phase 14, present within the separation vessel 1. A liquid to gas level within the separation vessel 1 would be symbolized as a level 13. The level 13 may represent the interface, typically as a flat plane in static or semi-static conditions, representing the top of the volume of the liquid phase 15 and therefore the bottom of the gas phase 14, withing the separation vessel 1. Typically, the gas phase 14 would have a smaller volumetric mass density compared to the liquid phase 15.

Different types of separation vessel 1 may be used, such as mechanical, gravity or centrifugal. The usage, shape and types of separation vessel 1 may depend on the proportion of fluid versus gas to be separated, the types of fluid or gas such as the expansion ratio between liquid and gas, the quantities of mixture being separated, the time and capacity of operation, the environment parameters such as pressure and temperature.

The liquid phase 15 may be pumped out of the separation vessel 1 from a vessel bottom connection 3, typically located at the bottom or at a lower point of the separation vessel 1. A liquid pump 10 or a group of liquid pumps 10, as further described in FIG. 3, may move the liquid phase 15 present inside the separation vessel 1 into an adjoining section 4.

The one or multiple liquid pumps 10 may be operated manually, remotely, or automated. Each liquid pump 10 may be operated through pneumatic, pressure, electrical, mechanical, or hydraulic means. The type of each liquid pump 10 may include a piston pump, a screw pump, a diaphragm pump, a centrifugal pump, a gear pump, a lobe pump, a metering pump, a progressive cavity pump, a plunger pump or multi-phase pump. The one or multiple liquid pumps 10 would displace the liquid phase 15 at a rate, typically between 0 and 3 BPM [0 to 0.5 m3/min].

As for the drawdown section 8, the adjoining section 4 may have the shape of a pipeline as depicted in FIG. 1, or the shape of a tank or vessel. The adjoining section 4 may itself be connected to a secondary adjoining vessel, not shown in FIG. 1, which would be used as a recovery vessel. The adjoining section 4 would receive the liquid phase 15 as a fluid product to be reclaimed in the process. The liquid phase 15, after flowing through the vessel bottom connection 3 would flow through a liquid flowline 17. The liquid flowline 17 may include the liquid pump 10 and a check valve 18, before reaching an adjoining section connection 6 to tie-in with the adjoining section 4. The check valve 18 would prevent the liquid phase 15 from flowing back towards the separation vessel 1, after being moved by the one or multiple liquid pumps 10 towards the adjoining section 4.

The adjoining section 4 may be separated from the drawdown section 8 by a pipe line block valve 12. The pipeline block valve 12 would typically be closed during draw down operation to prevent direct flow between the mixture contained within the drawdown section 8 and the mixture, typically fluids, contained within the adjoining section 4. The adjoining section 4 and the drawdown section 8 may also not be in line with each other's, and may be two separate or distinct sections of tanks, tubulars, vessels, hoses, and may not need the pipeline block line valve 12 as a separation.

The gas phase 14 may flow out of the separation vessel 1 through the vessel top connection 2, and may flow through a flare section 16, typically as a discharge flow and may not need a dedicated pump. The flow of gas within the flare section 16 towards the flare 7 may be controlled by a flow control valve 9.

The flow control valve 9 may a device or group of devices to restrict or control the flow of gas flowing to the flare 7 through the flare section 16. The flow control valve 9 may be operated manually, remotely or automated. The operation mode of the flow control valve 9 may be through pneumatic, pressure, electric, mechanical, hydraulic or manual means. The flow control valve 9 may be designated as regulator, choke, throttle valve, float valve, gate valve, globe valve, butterfly valve, pinch valve, diaphragm valve, reducing valve, regulator valve or needle valve.

The flow of gas through the flare line 16, controlled by the flow control valve 9, may influence the separation efficiency of the separation vessel 1 and may in turn influence the flowrate of the flow line 11 pulling typically a mixture of gas and liquid from the draw down section 8. The objective of the process may be to keep the flowrate out of the draw down section 8 as high as possible, while keeping operating within the limits of the flare 7, including for example the pressure, velocity, smoke, heat, within the flare 7. Keeping a high flowrate out the draw down section 8 would also keep a high flowrate of the fluid phase 15 flowing through the liquid flowline 17. The gas flow through the flare section 16 to the flare 7 may be reduced or shut off, if the capacity of the liquid pump 10 cannot regulate the level 13 within the separation vessel 1. An over-proportion of the liquid phase 15 inside the separation vessel 1 may conduct the liquid phase 15 to flow to the flare 7, which would typically be avoided. Another parameter to regulate with the flowrate to the flare 7 may be the pressure within the separation vessel 1. A higher pressure in the separation vessel 1 would minimize vaporization. Additional regulation of the level 13 may be necessary if the evaporation process increases inside the separation vessel 1, requiring increasing the flowrate inside the flare section 16, through the flow control valve 9, towards the flare 7. As the proportion of the fluid inside the drawdown section 8 continues to decrease or pressure within the flow line 11 continues to drop below a critical point, typically below the vapor pressure of the fluid mixture, it may be necessary to further adjust the gas or liquid flowrates, through the flow control valve 9 or liquid pump 10, to ensure the highest proportion of the drawdown mixture from the drawdown section 8 remains in liquid phase. Process parameters and a regulation method are proposed within FIG. 4-5.

In FIG. 1, grade 19 may represent the ground level. A below-grade section 20 may be present below grade 19, typically between 3 to 30 ft [1 to 10 m] below ground level. A possible wave effect may appear in the below-grade section 20 in case of slug formation inside the drawdown section 8 as detailed in the existing art description.

An injection of inert gas may be added to the application process and is symbolized in FIG. 1 with a gas injection line 24. Inert gas such as nitrogen may be added through the gas injection line 24 to the liquid flowline 17 at the opposite end of the liquid pump(s) 10. The inert gas may assist in the movement of the liquid product to the end of the liquid flowline 17, where the liquid pump 10 may keep the product in a liquid state for a more efficient pumping operation.

Figure 2:
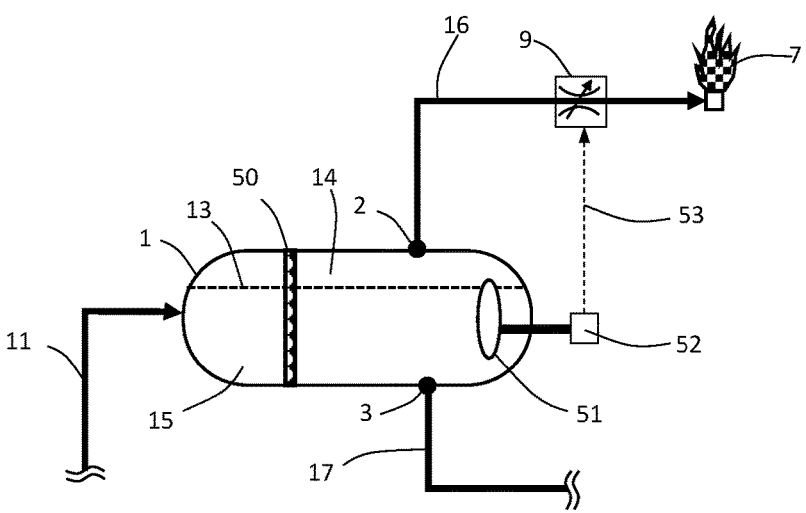
FIG. 2 represents a detailed view around the separation vessel and possibility to link a level indicator or level controller.

FIG. 2 represents a detailed view of FIG. 1, in particular around the separation vessel 1, and depicts a possible variation compared to FIG. 1. As represented in FIG. 2, the separation vessel 1 may include a level indicator 50. The level indicator 50 may indicate visually the position of the level 13, showing the interface between the liquid phase 15 and gas phase 14. The level indicator 50 may correspond to the position of a floater linked to the fluid upper surface present inside the separation vessel 1.

As another variation, depicted in FIG. 2, a level controller 51 may be present within the separation vessel 1. The level controller 51 may include a sensing unit able determine the level 13 and indicate the amount of liquid phase 15 as well as gas phase 14, within the separation vessel 1. The level controller 51 may be linked to a float gauge as well as to other types of ultrasonic or pressure measurement to determine the level 13. The level controller 51 may be connected to an electronic recorder 52 or converter, which may convert the physical level 13 in a digital or electronic form. The electronic recorder 52 may itself be linked to a feedback connection 53 which may communicate for example with the flow-control valve 9. The feedback connection 53 may have the form of a wire connection or a wireless connection. The flow-control valve 9 may therefore include the parameters sent by the electronic recorder 52, allowing to adjust its opening or closing position based on the level 13 or other parameters recorded within or around the separation vessel 1, such as pressures, temperatures and flow-rates. Additional details regarding regulation possibilities are further described in FIG. 4-5.

Figure 3:
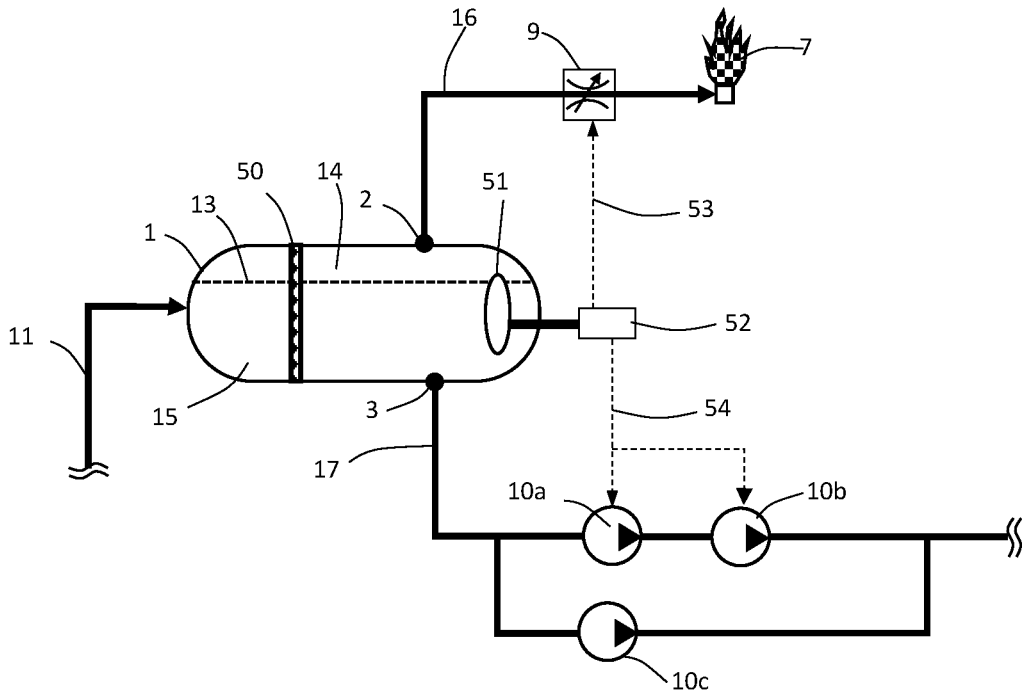
FIG. 3 represents a detailed view of multiple fluid pumps possibility with multiple fluid pumps in series or parallel on the fluid flowline.

FIG. 3 represents a variation to FIG. 1 regarding the liquid pump 10. More than one liquid pump 10 may be present. As non-limiting example, FIG. 3 includes two liquid pumps in series 10a and 10b, and one liquid pump in parallel 10c. Any combination of liquid pumps 10 in series or in parallel may be possible to obtain the desired flowrate and efficiency for the pumping through the liquid flowline 17. The combination of pumps 10 may also be arranged to allow the pumping of inert gas through the gas injection line 24. Therefore, and not represented, more than one gas injection lines 24 may be added to conform with the different branches of the liquid flowline 17 and the different combinations of liquid pumps.

FIG. 3 also represents a possible feedback connection 54 between the level controller 51 and the pumps 10a, 10b or 10c. The feedback connection 54 may be a wired connection or a wireless connection, and may have the ability to act on one or more of the fluid pumps 10a, 10b and 10c. The feedback connection 54 may therefore have an influence on some parameters of the fluid pump 10 or any combination of fluid pumps 10a. 10b or 10c. Parameters of the pump 10, as well as 10a, 10b or 10c, may include for example the discharge flowrate, the inlet and the outlet pressure, the fluid density.

Figure 4:
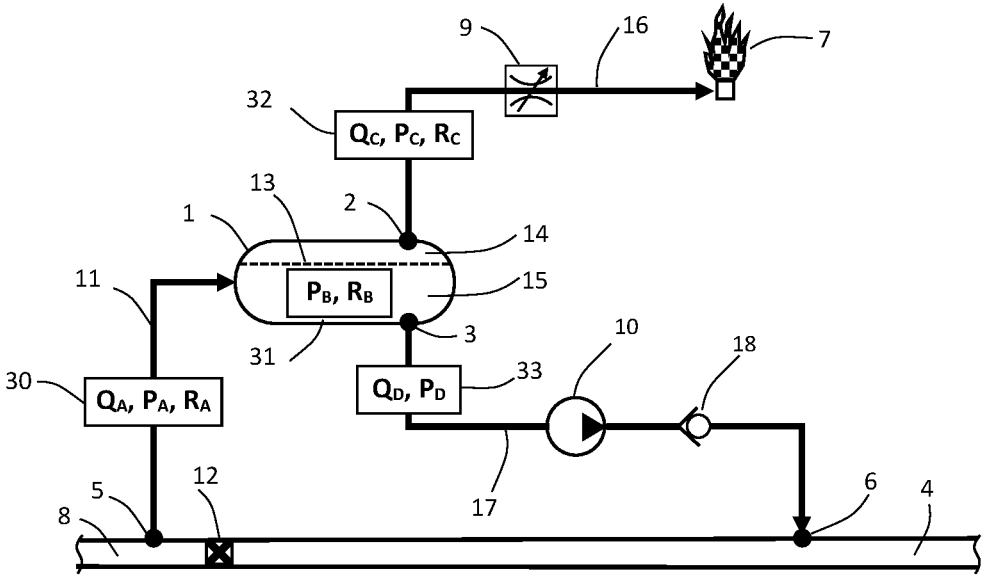
FIG. 4 represents a schematic of some parameters relevant for the proposed invention linked with a proposed schematic and arrangement of components.

FIG. 4 represents possible parameters present in the process, which may be used for a regulation method.

Parameters 30 represent the variables which may be significant for the flow section 11, between the drawdown section 8 and the separation vessel 1. Parameters 30 may be described as following:

$Q_A$ would represent the flowrate of the fluid mixture including the liquid phase 15 and gas phase 14, further present within the separation vessel 1. Standard $Q_A$ flowrate would typically be in the range from 0 to 1 million scf/hour, as standard cubic feet of gas per hour [0 to 28,000 cubic meters per hour];

$P_A$ would represent the fluid mixture pressure within the flow section 11. Standard $P_A$ pressure would typically be similar to the pressure within the drawdown section 8 and would vary through the drawdown process as the fluid transition from liquid phase to gas phase. To ensure maximum liquid phase, a typical pressure may be kept at 10% above the vapor pressure of the fluid mixture;

$R_A$ would represent the ratio of liquid versus gas within the mixture flowing inside the flow section 11. A $R_A$ of 1 would mean a full liquid mixture, and a $R_A$ of 0 would mean a full gas mixture. Standard $R_A$ ratio would typically be start as 1 with full liquid and transition through the drawdown process to 0 with full gas at the end.

Parameters 31 represent the variables which may be significant within the separation vessel 1. Parameters 31 may be described as the following:

$P_B$ would represent the fluid mixture pressure within the separation vessel 1. Standard $P_B$ pressure would typically be close to the pressure $P_A$, and may be kept at 10% above the vapor pressure of the fluid mixture;

$R_B$ would represent the ratio of liquid versus gas within the separation vessel 1. A $R_B$ of 1 would mean a full liquid mixture, and a $R_B$ of 0 would mean a full gas mixture. The ratio $R_B$ would relate directly to the level 13 within the separation vessel 1. The ratio $R_B$ could be derived from the level indicator 50 or the level controller 51, as described in FIG. 2. Assuming the separation vessel 1 works in steady mode and within its recommended range, the fluid within the separation vessel 1 would be either in liquid form, as liquid phase 15 or in gas form, as gas phase 14, and both phases would typically fully fill the main volume of the separation vessel 1.

Parameters 32 represent the variables which may be significant for the flare section 16, between the top connection 2 of the separation vessel 1 and the flare 7. Parameters 32 may be described as the following:

$Q_C$ would represent the flowrate of the gas flowing inside the flare section 16. Standard $Q_C$ flowrate would typically be in the range of 0 to 1 million scf/hour, as standard cubic feet of gas per hour [0 to 28,000 cubic meters per hour];

$P_C$ would represent the gas pressure within the flare section 16. Standard $P_C$ pressure would typically be in the range of 0 psi to 250 psi [0 to 1.7 MPa];

$R_C$ would represent the ratio of liquid versus gas within the mixture flowing inside the flare section 16. A $R_C$ of 1 would mean a full liquid mixture, and a $R_C$ of 0 would mean a full gas mixture. Standard $R_C$ ratio would typically be close to 0, as the highest proportion of gas would be recommended to flow inside the flare section 16 to reach the flare 7, and avoid operation or safety issues.

Parameters 33 represent the variables which may be significant for the liquid flowline 17, between the bottom connection 3 of the separation vessel 1 and the adjoining section 4. Parameters 33 may be described as the following:

$Q_D$ would represent the flowrate of the liquid flowing inside the liquid flowline 17. Standard $Q_D$ flowrate would typically be in the range of 1 to 3 BPM [0.16 to 0.5 cubic meter/minute];

$P_D$ would represent the liquid pressure within the liquid flowline 17. Standard $P_D$ pressure would typically be in the range of 1,000 psi to 2,000 psi [6.9 MPa to 13.8 MPa], depending on equipment type such as the liquid pump(s) 10 and the rating of the liquid flowline 17, as maximum allowable pressure for safe operation.

Note that by default, only liquid phase 15 would be present inside the liquid flowline 17.

Figure 5:
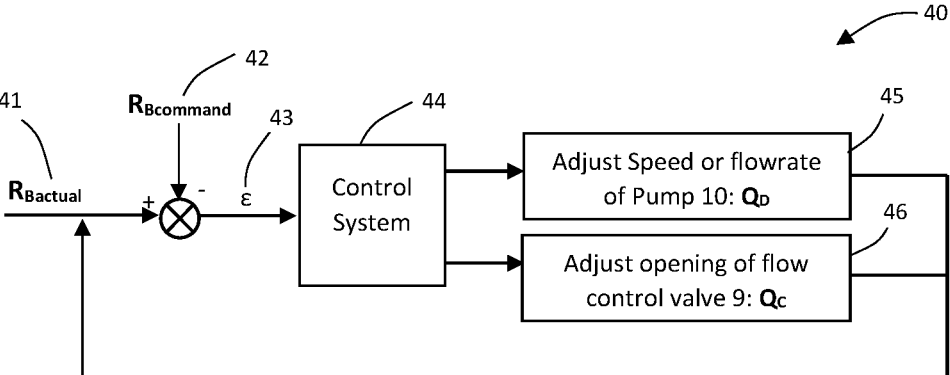
FIG. 5 represents a possible regulation flow diagram linked with the proposed invention.

FIG. 5 represents a regulation flow diagram as a part of the proposed invention.

A primary goal of the regulation method, represented as a regulation loop 40 in FIG. 5, as steady mode, includes regulating $R_B$, or the ratio of liquid versus gas within the separation vessel 1.

$R_{Bactual}$ 41 would represent an input or actual measured ratio or level inside the separation vessel 1. $R_{Bcommand}$ 42 would represent a target ratio or level considered as a command. $R_{Bcommand}$ could include a wished ratio, typically between 0.4 to 0.6, as well as a $R_{Bmin}$, representing the minimum ratio for an optimum operation, and a $R_{Bmax}$, representing the maximum ratio for an optimum operation. A typical $R_{Bmin}$ value may be between 0.1 and 0.3. A typical $R_{Bmax}$ value may be between 0.7 and 0.9. The consequence of the $R_B$ regulation may be to maintain $Q_A$ high enough, pulling from the draw-down section 8, in order to maintain $R_B$ above $R_{Bmin}$ and therefore the necessary liquid phase 15 for the liquid pump(s) 10 to reclaim. The difference between $R_{Bactual}$ 41 and $R_{Bcommand}$ 42 would be calculated as the regulation difference & 43. A typical goal of the regulation loop 40 may be to keep the regulation difference & 43 as small as possible or within predetermined limits corresponding to the minimum and maximum wished ratio $R_{Bmin}$ and $R_{Bmax}$.

Additional goals of regulation may include keeping $Q_C$ as high as possible, keeping $Q_D$ as high as possible, keep $R_B$ as low as possible, i.e. maximum gas and mini liquid, or optimizing $Q_C$ so that $P_B$ is as high as possible to prevent vaporization.

The regulation loop may include $R_{Bactual}$ 41 as input. A first output action 45 may be the adjustment of the speed or flow output of liquid pump(s) 10, which may directly influence $Q_C$. A second output action 46 may be the adjustment of the opening of the flow control valve 9 which may directly influence $Q_D$.

The regulation loop 40 may be controlled by a control system 44 performing at a predetermined frequency, either manual or automatic, typically between once every 1 second to once every 10 hours.

The electronic recorder 52 and the feedback connection 53 and 54, as depicted in FIG. 3, may be part of the control system 44. The control system 44 may automatically operate, regulate or adjust the opening of the flow control valve 9 as well as the speed or rate of the pump(s) 10, as depicted in the first output action 45 and in the second output action 46.

Other regimes may also be part of the regulation loop 40, with additional output and specific actions. Other regimes may include a start regime or an end regime. Example of a start regime, which may be performed as part of the process, may include the removal of contaminates such as air, nitrogen within the separation vessel 1. Other start regimes may include the purge of the flare 7 using product from the drawdown section 8. Example of end regimes may include opening the flow control valve 9 towards the flare 7 to its maximum, allowing the maximum flow of gas phase 14, in case for example if the level 13 is down below 0.25.

What is claim is:

1. A method to evacuate a gas/liquid mixture from a drawdown section comprising the steps of:

flowing the gas/liquid mixture from the drawdown section into a separation vessel;

allowing the gas/liquid mixture to separate into a liquid phase and a gas phase within the separation vessel;

establishing a liquid level at an interface between the liquid phase and the gas phase;

flowing the gas phase out of the separation vessel through a control valve towards a flare where it is burned, while simultaneously flowing the liquid phase out of the separation vessel through one or more pumps to an adjoining section;

monitoring the liquid level;

controlling the liquid level in response to the monitored level by manipulating the control valve to adjust the flow of the gas phase out of the separation vessel and adjusting the flow rate of the liquid phase out of the separation vessel by manipulating the discharge rate of the one or more pumps in order to maintain the liquid level inside the separation vessel at a predetermined level, or between a minimum and a maximum level; and injecting an inert gas into the liquid phase after the liquid phase has flowed through the one or more pumps, the injection flow direction of the inert gas being opposite to the flow direction of the liquid phase.

2. The method to evacuate a gas/liquid mixture from a drawdown section of claim 1, wherein the controlling step is accomplished manually.

3. The method to evacuate a gas/liquid mixture from a drawdown section of claim 1, wherein the controlling step is automated.

4. The method to evacuate a gas/liquid mixture from a drawdown section of claim 1, wherein the inert gas is nitrogen.

5. The method to evacuate a gas/liquid mixture from a drawdown section of claim 1, wherein the predetermined liquid level is between 40% and 60% of a level corresponding to 100% liquid phase.

6. The method to evacuate a gas/liquid mixture from a drawdown section of claim 1, wherein the minimum liquid level is between 10% and 30% of a level corresponding to 100% liquid phase.

7. The method to evacuate a gas/liquid mixture from a drawdown section of claim 1, wherein the maximum liquid level is between 70% and 90% of a level corresponding to 100% liquid phase.

8. The method to evacuate a gas/liquid mixture from a drawdown section of claim 1, wherein the liquid level is monitored with a level indicator.

9. The method to evacuate a gas/liquid mixture from a drawdown section of claim 1, wherein the liquid level is monitored with a level controller.

10. The method to evacuate a gas/liquid mixture from a drawdown section of claim 9, wherein the level controller provides a feedback signal to manipulate the control valve or to manipulate the one or more pumps.

11. A system for evacuating a drawdown section comprising:

a separation vessel configured to receive a flow of a gas/liquid mixture from a drawdown section and allow the gas/liquid mixture to separate into a liquid phase and a gas phase within the separation vessel;

a control valve controllable to flow the gas phase out of the separation vessel towards a flare where it is burned;

one or more pumps controllable to flow the liquid phase out of the separation vessel to an adjoining section while the control valve is flowing the gas phase towards the flare;

a liquid level controller configured to perform operations comprising:

monitoring a liquid level within the separation vessel;

actuating the control valve to adjust the flow of the gas phase out of the separation vessel; and adjusting the flow rate of the liquid phase out of the separation vessel by manipulating the discharge rate of the one or more pumps, wherein the actuating of the control valve and the adjusting of the flow rate of the one or more pumps is configured to maintain the liquid level inside the separation vessel at a predetermined level, or between a minimum and a maximum level; and a gas injection line configured to inject an inert gas into the liquid phase after the liquid phase has flowed through the one or more pumps in an injection flow direction that is opposite to a flow direction of the liquid phase.

12. The system for evacuating a drawdown section of claim 11, wherein the inert gas is nitrogen.

13. The system for evacuating a drawdown section of claim 11, wherein the predetermined liquid level is between 40% and 60% of a level corresponding to 100% liquid phase.

14. The system for evacuating a drawdown section of claim 11, wherein the minimum liquid level is between 10% and 30% of a level corresponding to 100% liquid phase.

15. The system for evacuating a drawdown section of claim 11, wherein the maximum liquid level is between 70% and 90% of a level corresponding to 100% liquid phase.

* * * * *